April 23, 1929.  G. G. EARL  1,710,048
LIQUID COLLECTING SYSTEM
Filed May 27, 1927   3 Sheets-Sheet 1
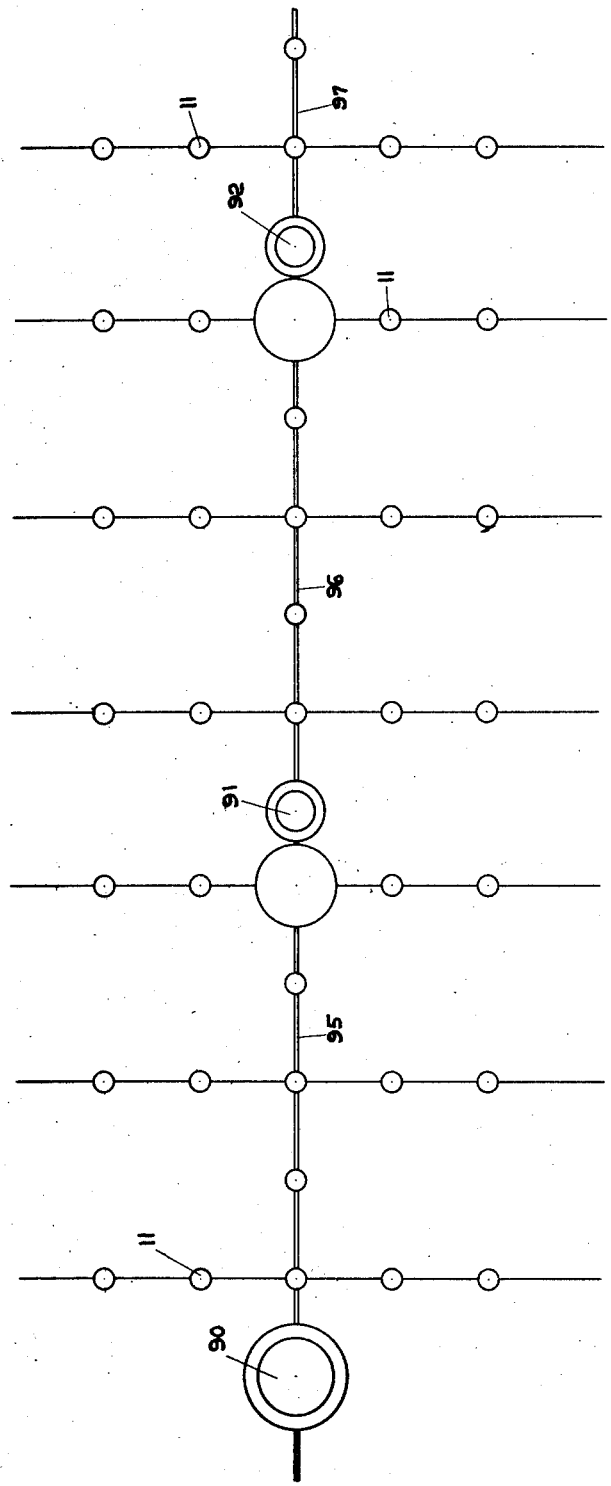
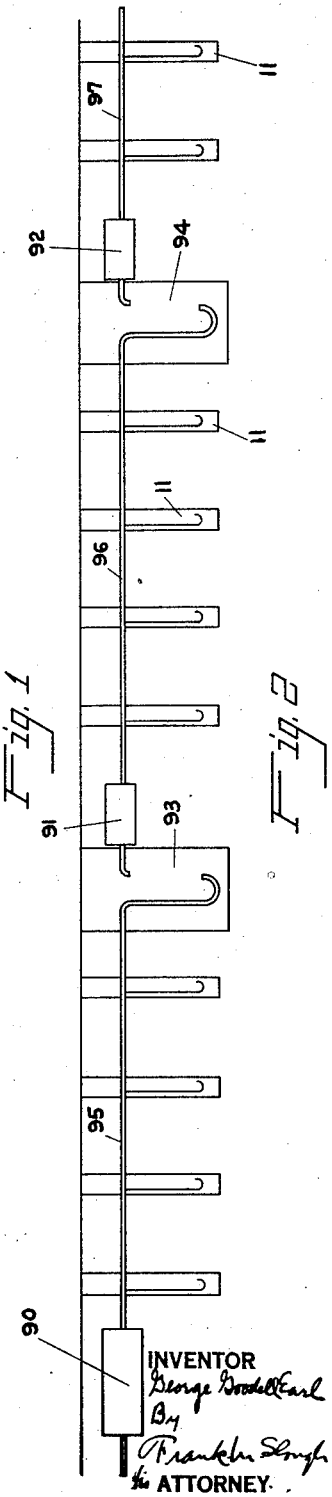
INVENTOR
George Goodell Earl
By Franklin Slough
his ATTORNEY April 23, 1929.  G. G. EARL  1,710,048
LIQUID COLLECTING SYSTEM
Filed May 27, 1927  3 Sheets-Sheet 2
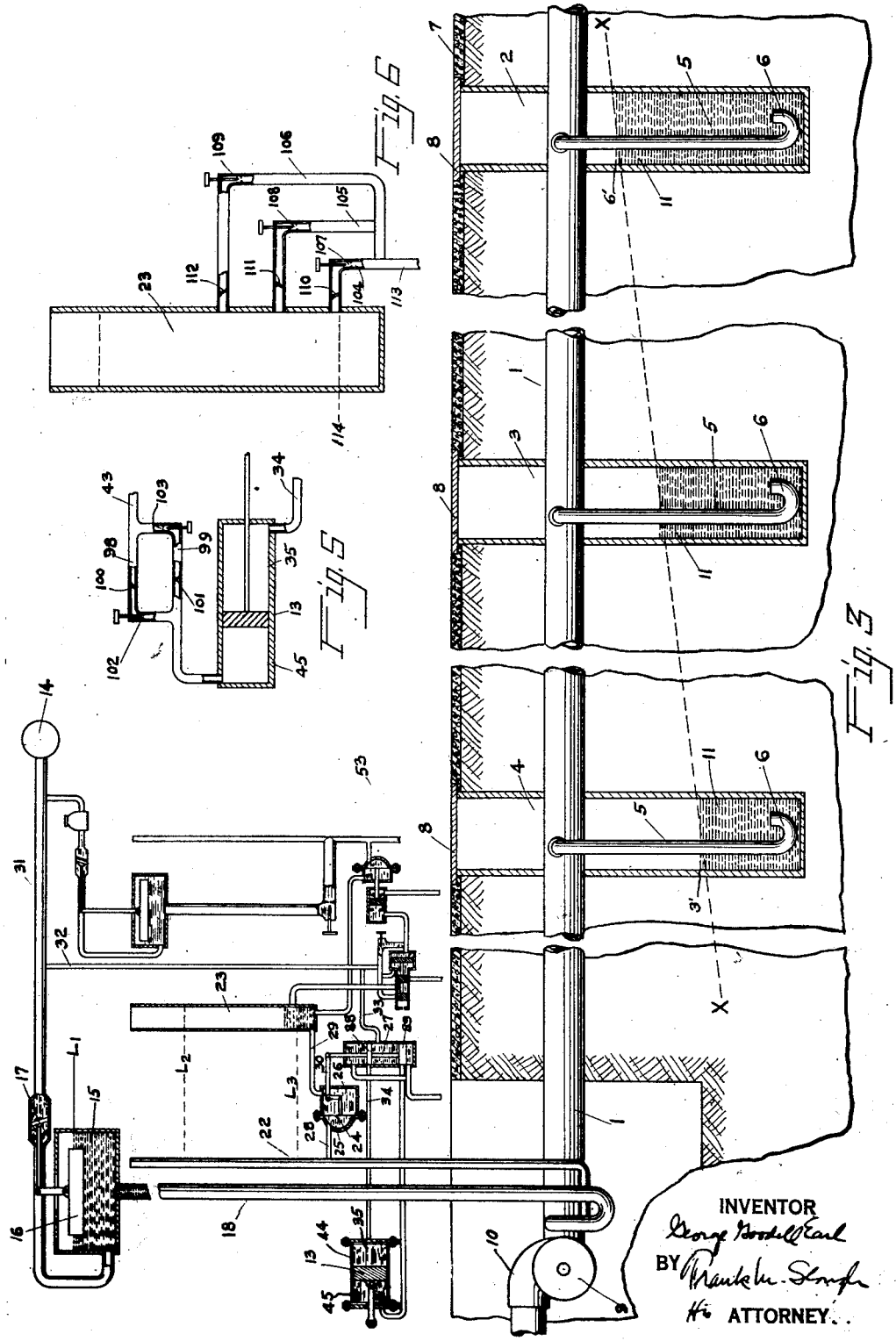

April 23, 1929.  G. G. EARL  1,710,048
LIQUID COLLECTING SYSTEM
Filed May 27, 1927   3 Sheets-Sheet 3
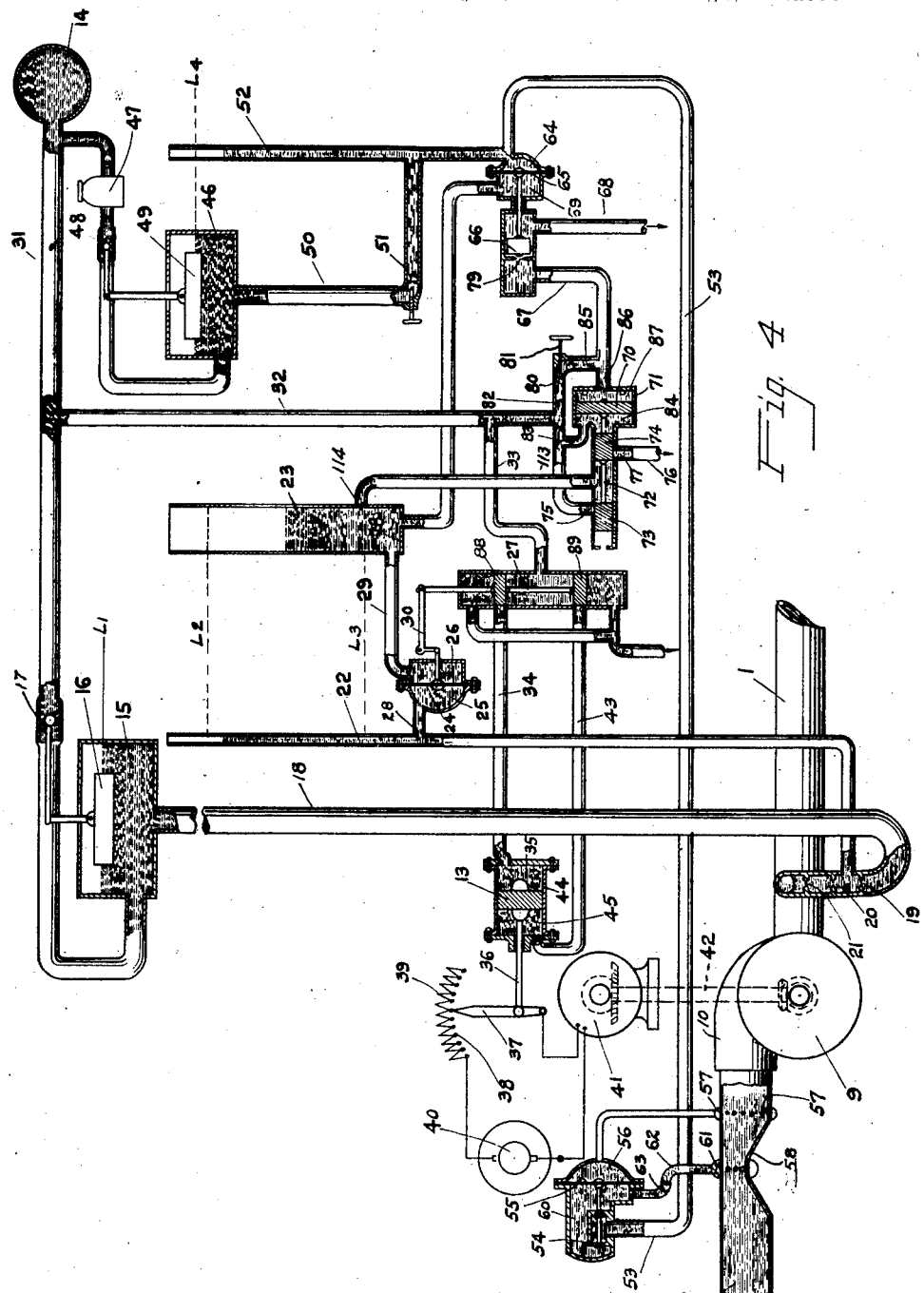
INVENTOR
George Goodell Earl
BY Frank M. Slough
His ATTORNEY Patented Apr. 23, 1929.

1,710,048

UNITED STATES PATENT OFFICE.

GEORGE GOODELL EARL, OF NEW ORLEANS, LOUISIANA.

LIQUID-COLLECTING SYSTEM.

Application filed May 27, 1927. Serial No. 194,611.

My invention relates to liquid collecting systems and is particularly applicable to liquid collecting systems employed for the continuous collection of sewage and drainage.

The construction of an adequate liquid collecting system in a locality where large, nearly level areas exist, or where the collecting station is not lower in elevation than the areas served, is very expansive, and this is particularly true where the present population of the area is scattered or the area comprises scattered groups of population, such population requiring immediate service but in which area eventually a vastly denser population requiring a greater service may be located. Especially is this true where soil conditions resulting from the presence of quicksand or such other conditions make deep excavations extremely costly and the maintenance of deep sewers expensive and difficult.

Under conditions such as the above, where an adequate sewage system for the ultimate service is provided for such an area, such an adequate system is practically prohibitive in first cost; if a system is installed at a moderate cost to take care of the present demand it is later found to be inadequate for handling the ultimate demand for service, due to the growth of population in the area served, a much greater demand is put upon the system.

It is an object, therefore, of my present invention to provide a system which will be capable of being installed at a minimum cost for service in present sparsely settled regions and which may be expanded from time to time as the population of the area served increases, and in such a manner that the cost of expansion is relatively low compared with the cost of similarly expanding the present known systems.

Another object of my invention is to prevent the loss of liquid from the system by providing means to draw the same thru the conduits provided under negative pressure of "suction" so-called.

Another object of my invention is to provide a liquid collecting system for purposes of collecting sewage or for draining outlying areas which comprises means for automatically governing the flows thru the system conduit so as to produce a suction draft commensurable with the quantity of liquid required to be drained from the system at any and all times.

Another object of my invention is to provide a system of this type having centralized efficiently operating controlling means whereby the necessity of installing and maintaining automatic apparatus comprising movable mechanical parts at outlying points need not be provided.

Another object of my invention is to provide a system wherein efficient service can be given under otherwise unfavorable conditions of terrain sometimes encountered.

Other objects of my invention and the invention itself will be apparent from the following specification comprising drawings, in which drawings:

Fig. 1 shows a diagram or map in plan of a system comprising outlying liquid collecting wells and conduits leading therefrom to a central pump station;

Fig. 2 shows a diagram of a vertical section of the system of Fig. 1;

Fig. 3 shows diagrammatically, in vertical section, a view of a conduit line leading from a plurality of outlying collection wells to a central pumping station, and shows diagrammatically the controlling apparatus at the central station.

Fig. 4 shows diagrammatically the central station controlling apparatus;

Fig. 5 shows a modified form of apparatus adapted to be substituted for apparatus in the system of Figs. 3 and 4; and Fig. 6 shows a modified form of apparatus adapted to be substituted in the systems of Figs. 3 and 4 for apparatus shown therein.

Referring now to the different figures of the drawings and particularly to Figs. 3 and 4, at 1, I show a suction liquid collecting main such as a sewer pipe which is adapted to collect liquids which accumulate in a plurality of wells such as the wells 2, 3 and 4 disposed so as to be traversed by the pipe 1, and in each of said wells I provide an intake pipe 5, having an upturned end 6. The wells are each preferably of substantially the same depth from the surface 7 of the ground in the territory reserved by the suction liquid collecting main 1, and will be covered by manhole covers 8 arranged approximately flush with the surface of the ground in the usual manner.

At 9, I show a hydraulic pump adapted to draw liquids from the pipe 1 and expel the same into a discharge conduit 10 leading to a drainage canal or sewage disposal plant or to any suitable point where the collected liquids are to be expelled from the system. The pump 9 is, by the operation of apparatus presently to be described, adapted to draw the liquids from the wells 2, 3 and 4 and other wells like them throughout the length of the sewage main 1, the greatest lifting effort being naturally exerted in those wells such as 4 which are nearest the pump 9, the lifting effort being less and less progressive toward the outer end of the pipe 1.

In the system being described, it will be assumed that the well 4 represents a well relatively near the central pumping station, the well 2 near the end of the sewage main 1 and the well 3 being an intermediate well, and it is assumed, moreover, that other wells may be provided intermediate the wells just mentioned and beyond the well 2, if desired, but that in all cases due to the action of the pump 9 under control of the apparatus at the central pumping station, a hydraulic gradient represented in Fig. 3 by the interrupted line X—X, will be produced indicating the liquid lifting power at the different wells, the lower the level of the liquid indicated at 11, the greater the lifting effort at such well since it is assumed that the discharge from each of the wells will be in proportion to the lifting effort.

This hydraulic gradient may be varied from time to time due to sudden changes in the rate at which liquid is supplied at some of the wells, but in a short time the gradient will be restored, departing somewhat therefrom in case of a long sustained abnormal flow into certain of the wells.

At 13, I show a fluid pressure operated piston by which, as will be hereinafter explained, in connection with the discussion of the operation of the system, and wherein reference will be had to certain apparatus not shown in Fig. 2 but shown in Fig. 3, the pumping effort of the pump 9 may be diminished or increased, the control apparatus generally shown to the right of the piston 13 automatically causing the movement of the piston 13 to the right or to the left to diminish or to increase the pumping effort according to the demand of the system.

It is, of course, apparent that during times of flood and severe rains in the territory served by the drainage system, the pumping effort will necessarily be required to be increased since the quantity of liquid removed from the wells depends solely upon the pumping effort. Therefore, I so arrange certain apparatus at the central station to control the movement of the piston 13 in such a way that it will be responsive to the quantity of liquid contained in the wells, particularly the more distant wells, to move the piston 13 as may be required to maintain between definite limits the levels at the more distant wells substantially constant.

In order to accomplish, therefore, the automatic control of the pumping effort according to the needs of the system, particularly where such needs are variable, as in a drainage system, I provide in connection with the controlling apparatus at the central station, a source of fluid under pressure indicated at 14, a float chamber 15 containing a float 16 adapted to be raised or lowered according to the level of the liquid in the chamber, a valve 17 responsive to the movements of the float 16 to admit more or less liquid into the chamber 15, the arrangement being such that a constant liquid level $L_1$ is maintained in the chamber 15. From the chamber 15, under a constant head, liquid will be discharged through the conduit 18 through a plurality of orifices herein shown as three in number at 19, 20 and 21, being delivered into the main 1 at a point adjacent to and on the approach side of the pump 9. Any desired number of orifices such as those shown may be provided, the number being determined by the head due to the height of the liquid level $L_1$ and to the responsiveness of the apparatus hereinafter described as being movable under the influence of liquid in the liquid column 22 disposed upright and communicating with the conduit 18 at a point between two of the orifices in the conduit 18 such as between the orifices 19 and 20. By communicating the liquid in the column 22 with a point intermediate two of a plurality of orifices disposed serially in the conduit 18, the liquid resulting from such communication will be caused to rise in the column to a height which is determined by the number of such orifices and reduced by increasing the number, and that the pressure indicated by the height of the water in such a column is proportional to the flow through the conduit 18.

At $L_2$ and $L_3$, I indicate the maximum and minimum heights to which water may rise in the column 22. At 23, I show a second liquid column of preferably larger volume in which water may rise to the levels permissible in the column 22, that is, between maximum and minimum levels $L_2$ and $L_3$ and which will contain a certain amount of liquid at all times. At 24, I show a movable member herein illustrated as a diaphragm disposed between two fluid containing cells 25 and 26, and differentially operable according to the relative pressure in the two cells to move a valve 27 which controls the movement of piston 13. The piston 13 as has been said will in turn control the pumping effort of the pump 9, therefore, the movements of the diaphragm 24 responsive to the difference of fluid pressure on its side, controls the pumping effort through the action of the valve 27. Fluid in the cell 25 is derived by a connecting duct 28 communicating with the column 22 and therefore the pressure of fluid in the cell 25 will be responsive to the height of liquid in the column 22, and will variably act on the movable diaphragm 24 according to such varying heights. A conduit 29 likewise communicates liquid from the column 23 to the cell 26, and the action of fluid pressure in the cell 26 upon the diaphragm 24 is responsive to the height of liquid in the column 23, and opposes the pressure in the cell 25 which results from the liquid level 22.

The arrangement as so far described is for the purpose of increasing the pumping effort of the pump 9, or decreasing such effort according to the relative heights of liquid in the columns 22 and 23, the mechanical linkage 30 connecting the diaphragm 24 to the valve 27 being so arranged that upon an excess of pressure in the column 22 over that in the column 23, the diaphragm 24 moving toward the right as illustrated, will lift the valve 27 with its fluid controlling pistons 88 and 89 to permit fluid under pressure to flow from the source 14 through conduits 31, 32 and 33 and past the lifted piston 88 of the valve 27 into the conduit 34 which leads to the cylinder 44 entering said cylinder on the right side of the piston 13 to communicate pressure to the chamber 35 and to cause the piston 13 to move toward the left. This, as is shown in Fig. 4, causes the piston rod 36 to move the arm 37 of an electrical rheostat having switch points such as shown at 38 to move to the left and to decrease the amount of electrical resistance 39 included in the circuit of the source of electric current 40 and the electric motor 41 which is energized by current from the said source. The effect of decreasing the resistance in the motor circuit is to increase its speed and thereby the speed of the pump 9 which is operated through a shaft 42 driven by the electric motor 41; thus, whenever the level of liquid contained in the column 22 increases, the resultant increase of the pressure on the diaphragm 24 causes the pump 9 to increase its pumping effort on the system and responsive thereto the level in the column 22 will immediately be lowered with a consequent modification of the control exercised by the diaphragm 24 upon the rheostat in the motor circuit to again decrease its speed. The speed of the motor is decreased in the same manner by a movement of the piston 13 to the right instead of to the left, such movement being caused by fluid from the source 14 passing through conduits 32, 33 and past the valve element 89 and through the conduit 43 passing into the chamber 45 moving the rheostat arm 37 to the right to increase the resistance in the motor circuit.

It will be understood that the level of liquid in the column 22 is responsive to the suction draft exerted by the pump 9 on its inlet side, the greater the suction draft exercised by the motor 9, the lower the level of the liquid in the column 22, and vice versa.

Now, in order to accomplish the proper exercise of control over that portion of the apparatus just described and which controls the pumping effort of the pump 9, the diaphragm 24 must be responsive to the fluid pressure in the cell 26, and which fluid pressure is derived from the liquid column 23, and this fluid pressure must in turn be a measure of the requirements of the system served by the pump, consequent upon a given condition in the wells of the system. That is, whenever the level of liquid in the more distant wells is greater than a predetermined low level, the pressure exerted upon the diaphragm 24 by the liquid in the column 23 must be of such a value relative to the pressure in the cell 25, opposing it, that the diaphragm 24 responsive to the difference of pressure in the cells 25 and 26 will move in that direction which will, as has been described, cause a greater pumping effort, such greater pumping effort being necessary to reduce the height of the liquid contained in the more distant wells. The reverse is also true, that consequent upon a predetermined low level of liquid in the more distant wells, the liquid level in the column must be changed responsively so that the pump 9 will reduce its pumping effort so that liquid may again collect in the wells above such predetermined low level. Thus the system may operate in cycles of increasing and decreasing pumping effort values to maintain within the given limits a predetermined level of liquid in the more distant wells. In order to accomplish this, the apparatus shown generally to the right of the column 23 and of the valve 27 is provided. This apparatus comprises a float chamber 46 receiving liquid from the source of liquid under pressure, 14, preferably through a meter 47, the flow of liquid from the source to the float chamber being controlled by a valve 48, the valve cutting off the flow into the chamber 46 whenever the float 49 resting on the surface of the liquid is raised to a predetermined high level, and the valve 48 opening whenever the level of the liquid in the float chamber is sufficiently decreased. This arrangement insures that a certain definite liquid level $L_1$ may be made equal to that level $L_2$ previously mentioned for the columns 22 and 23, be maintained in the float chamber 46. Float chamber 46 supplies a flow of liquid through a conduit 50 and an adjustable orifice 51 to supply a liquid column 52 with water, the level of the water in the column 52 being determined by the height of the liquid in the float chamber 46 and by the rate of discharge through a discharge pipe 53 and by the size of the orifice 51. The rate of discharge from the pipe 53 is determined by the position of a movable valve element 54. The movable valve element is controlled by the relative pressures on the two sides of the diaphragm 55. The pressure on the right side of the diaphragm is exerted by the pressure of the water or other fluid contained in the cell 56 and communicated to the cell 56 under pressure from the approach 57 of a venturi 58 in the discharge conduit 59 leading from the pump 9. Pressure is supplied to the diaphragm 55 opposing the pressure of the fluid in the cell 56 by fluid from the source 14 admitted to the cell 60 on the left side of the diaphragm 55 by the operation of the valve 54. The arrangement is such that whenever the pressure of fluid from the approach 57 of the venturi 58 exceeds the pressure of fluid in the cell 60 derived from the float chamber 46 through conduits 50 and 53 and through orifice 51, then sufficient additional fluid from the float chamber 46 will be admitted by the valve 54, moving to such an open position that the opposing pressure in the cell 60 will be built up until it is equal to the pressure in the cell 56, at which time the valve 54 will be again closed. Fluid constantly escapes from the cell 60 whenever the pressure in the cell 60 is above the pressure of the fluid in the conduit 59 at the throat 61 of such conduit. Since there is provided a duct 62 having an orifice 63 therein to communicate fluid under an excess of pressure in the cell 60 to the throat 61 of the conduit 59, the valve 54 therefore will be constantly operable to admit or to restrain the flow of fluid from the float chamber 46 to the pressure cell 60. This apparatus is effective, therefore, to produce in the conduit 53 a flow of water or like fluid from the chamber 46 which is proportional at all times to the flow through the venturi 58, that is, proportional to the discharge flow from the pump 9. The water in the column 52, therefore, which is disposed on the discharge side of the orifice 51 is representative and proportional to the pressure on the discharge side of the pump 9 and is substantially proportional to the "yield" of the pump 9 from the liquid collecting system, comprising such a pipe line as that shown at 1 and having intake pipes such as those shown at 5 leading thereto from wells such as shown at 2, 3 and 4.

At the bottom of the column of water contained in the pipe 52, I provide a fluid pressure cell 64 having a diaphragm 65, the pressure of fluid in the said cell adapted to exert a pressure on the diaphragm 65 tending to close a valve 66 arranged in a conduit 67 and limiting the flow of fluid from the said conduit to waste through the conduit 68. The pressure in the cell 64 is opposed by fluid pressure in a cell 69 on the opposite side of the diaphragm 65, pressure in the cell 69 being exerted by a column of liquid in the stand pipe 23. The effect of the diaphragm operated valve 66 is to effect the operation of a piston 70 in a cylinder 71 so as to move a valve 72 having valve elements 73 and 74, whereby liquid will be introduced to the column 23 whenever the valve 73 is operative in one direction to communicate water from the conduit 32 to the conduit 113 by the opening of a valve port 75, and also to reduce the height of liquid in the column 23 by permitting liquid to escape through the conduit 113 passing to waste through conduit 76 by the operation of the valve element 74 moving to the right to uncover the port 77 of the valve. The conduit 113 is joined at a point 114 above the bottom 78 of the stand pipe 23 a predetermined distance, so that under no circumstances will all of the water be removed from the stand pipe 23 but so that at all times a column of water will exist at 23 at least as high as the point 114.

The arrangement of valve 66, in its relation to the piston 70, whereby it controls the movement of the piston, is such that upon a movement of the valve 66, as illustrated, to the left, a closure of the valve opening 79 will occur. This takes place only when the water column in the pipe 52 is elevated to a height greater than that in the column 23. When the reverse is true, the valve is opened.

At 80, I provide an orifice, preferably made adjustable by a manually operated screw 81, to restrict the flow of water from the conduit 32 through the duct 82, in which duct the orifice 80 is placed, whereby whenever flow is permitted to pass through the valve opening 79, a difference of pressure will be exerted on the approach and discharge sides of the orifice 80. The discharge side of the orifice communicates by means of ducts 85 and 86 with a chamber 87 on the discharge side of said orifice. The piston 70 will be moved to the right on account of the difference of pressure on the two sides of the orifice 80 and when so moved will uncover the port 77 by the movement of the valve element 74 to the right, at which time fluid will be permitted to escape through such port from the liquid column 23, depressing such liquid column.

The lowering of the level of the liquid in column 23 has an effect, as before described, of permitting the diaphragm 24 to be moved to the right in consequence of a resultant excess of the fluid in the cell 25, thereby moving the valve 27 upwardly to communicate fluid to the cell 35 of the cylinder 44, thereby accomplishing the acceleration of the pump 9 by the movement of the rheostat arm 37 to the right, the movement of the arm 37 being accomplished by the movement of the piston 13. Therefore, whenever the level of fluid in the column 52 is depressed, relative to the level of fluid in the column 23, the pumping effort of the pump 9 will have been accelerated. The acceleration of the pumping effort will continue until the discrepancy between the levels is corrected. When this occurs the diaphragm 65 will resume that position wherein the valve opening 79 is closed and whereupon the fluid pressure on both sides of the orifice 80 will be the same, since there will be no flow through the orifice and there will then occur equal pressures upon the piston 70 by fluid communicated to the cells 84 and 87 from both sides of the orifice. However, at such a time the valve 70 will start to move to the left in consequence of the pressure exerted on the valve element 74 by the fluid in the cell 84. This movement continues until the valve port 75 is uncovered, whereupon fluid from the source 14, flowing through the conduit 32 and passing through the said port, will be communicated to the column 23 through the conduit 113. In this way the control apparatus is effective to accelerate or decrease the pumping effort to draw more or less liquids from the pipe 1 leading to the system served, as may be required, in order to maintain the levels of liquid in the wells 11 at the predetermined value. The pumping occurs in periods of accelerated pumping and diminished pumping efforts.

Referring now generally to the three liquid columns, 22, 23 and 52, it will be seen that the column 22 will contain liquid proportional to the suction lifting effort exerted by the pump 9 on the approach side of the pump—i. e., will represent a level inversely proportional to the number of feet of water capable of being lifted by the pump in a conduit connected on the approach side of the pump if such conduit were depending vertically therefrom. The higher the level of the liquid in the column 22, the lower being the suction lift indicated. In the column 52 the level of the liquid is proportional to the "yield" produced by the pump, this being proportional to the velocity of the liquid passing through the discharge pipe 59 leading from the pump, and the column might be graduated to indicate flow in unit of cubic feet per second flow. A high level of the liquid in the column 52 will therefore indicate a low value of flow from the pumps, and a lower level in the column 52 will indicate a greater rate of flow from the pumps. Columns 22 and 52 exercise a control on the level of the liquid in column 23 to cause it to accelerate or retard the pumping action. The pumping action is accelerated whenever the liquid level in column 23 is lowest, and the pumping action is diminished whenever the level of liquid in column 23 is higher than that in column 22, this occurring, as has been described, due to the resultant effect upon the diaphragm 24 which controls the valve 27. The height of liquid in column 22 is, as has been said, determined by the value of "suction lift" on the intake side of the pump, and if the value of suction lift is known and the velocity of the liquid in the discharge conduit 59 leading from the pump is known, then the level of the liquid in all of the outlying wells is also known, since with a given velocity on one side of the pump, the suction lift indicated by the column 22 will depend upon the effort necessary to be exerted by the pump to pump the liquid from the wells, and this effort will be less the higher the level of the liquid in the wells served, since it takes a greater pumping effort to lift water a distance of 6′ than it does for a distance of 3′.

In the practical application of the system of my invention, I may discharge the collected liquids from the discharge pipes 59 into any convenient place, such as a river, or I may make the system herein illustrated and described in Figs. 3 and 4 but a single unit in a larger system, in which case the discharge pipe 59 will lead into a well of a larger capacity than the wells 11. This larger well may be one of a plurality of such larger and perhaps some smaller wells served by a distant pump in the same manner generally as does the pump 9 serve the wells 11, until the collected liquids are conveyed in stages to a point where they can be finally disposed of. I illustrate in Figs. 1 and 2 such a system, wherein at 90, I show a main pumping station and at 91 and 92, I show auxiliary pumping stations, the auxiliary pumping stations and perhaps the main pumping stations serving a large number of small wells 11, such as the wells 11 of Figs. 3 and 4. The pumping stations 91 and 92 are effective to pump liquids in the larger wells 93 and 94, which may be adjacent to or remote from the stations 91 and 92, and from each of these larger stations, of which a plurality may be provided for each succeeding pumping station, the liquid is collected by such a succeeding pumping station along the line to the main station 90. Also, the pipe lines for each of the pumping stations, indicated at 95, 96 and 97 in Figs. 1 and 2, may be elevated one to the other—i. e., the pipe line 96 may be laid at a higher elevation than that of the pipe line 97, and the pipe line 95 may be at a still higher elevation if desired, if the terrain in the district served makes this advisable.

Referring now to Fig. 5, I show in this figure a portion of apparatus adapted to be substituted for the apparatus shown in Fig. 3 for operating the piston 13, and which are connected to conduits 34 and 43 so as to move the piston arm 36, the arrangement being such that the rate of motion in accelerating and retarding the pumping may be regulated by means of check valves and adjustable valves to a given rate of motion of the piston 13. By referring to Fig. 5, it will be seen that in the conduit 43, I provide a pair of branches 98 and 99 having check valves 100 and 101 placed therein, respectively, and also each contains an adjustable orifice shown at 102 for the branch 98 and at 103 for the branch 99. By this arrangement, the piston 13 will respond slowly to the admission of fluid into the one or the other cells 35 or 45, since the rate of flow of fluid contained in the cell 45 can be diminished by means of the check valves and adjustable valves herein shown and in a manner which is apparent.

At Fig. 6, I show a system of branching conduits 104, 105 and 106 having adjustable orifices 107, 108, and 109, contained therein, respectively, and containing moreover, respectively, check valves 110, 111 and 112. Such branches are adapted to be included between the conduit 113 of Figs. 3 and 4 and the liquid column or stand pipe 23, whereby the rate of draft from the governing chamber 23 is varied for the different portions thereof and the rate of filling the governing chamber 23 being regulated independently of the rate of draft from the chamber. In this Fig. 6, as in Figs. 3 and 4, the level of the liquid contained in the column 23 can never fall below the level of the point 114 of Figs. 3 and 4 and of Fig. 6, wherein the lowermost branch 104 communicates with the chamber 23 at such level. The level 77 corresponds with that level, which will not cause an uncovering of the liquid seal at any collection well, such as any of the wells 11. The arrangements of Figs. 5 and 6 may be employed in the systems of 3 and 4, wherever it is desired to slow down the corrective action of the apparatus so as to make the system operate smoothly and without violent changes. The arrangements of these figures can be employed in the same system or separately, according to the requirements of the system.

It will be understood that although in the drawings for clearness in illustration, I have located the diaphragm mechanisms 24, 65 and 55 at different levels, that preferably the diaphragms 24 and 65 will be disposed at the level of the bottom of the columns 23 and 52, respectively, which is at the level of the bottom 78 of the column 23, although this is not essential for a useful embodiment of my invention broadly considered; also the relative positions of the valves and the levels of the water or other fluid in the different parts of the system illustrated in the drawings are not to be taken as representing any particular operative relative positions, except as such may be understood from the specification describing the embodiment system and the relative positions of these parts set forth under different conditions of use above.

Having now described my invention in a particular embodiment, I am aware that numerous and extensive departures may be made from the embodiment of my invention herein illustrated and described, and which shows one form in which my invention may be embodied, but without departing from the spirit of my invention.

I claim:

1. The method of draining liquid collecting in a plurality of wells distributed over an area comprising the pumping at a central station of the liquid from the wells by reducing below atmospheric pressure the pressure of liquid flowing therefrom at the central station, and regulating the degree of such reduction of pressure inversely according to the flow resulting from a given reduced pressure.

2. In a fluid system, the combination with a pumping station, of a pipe line leading thereto, a plurality of collection wells along said line, ducts from said wells adapted to convey liquid from the wells into the line, said ducts having a lower trap portion intermediate its ends, a pumping mechanism at the station, governing means for the said mechanism, controlling means for said governing means, said controlling means comprising apparatus differentially responsive to the flow from the mechanism and the suction draft on the approach side of said pumping mechanism to control the operation of the governing means to increase the pumping effort of the mechanism whenever the ratio of pumping effort to liquid yield is increased beyond a predetermined amount, and to decrease such pumping effort when such ratio is decreased.

3. In a drainage system, a drainage conduit leading from a plurality of collection wells to a main station, a duct for each well having a liquid seal trap therein and having an opening disposed near the bottom of the well, adapted to communicate liquid from the well to said conduit, said conduit being approximately level throughout its length, a pumping mechanism at the main station adapted to draw liquid from the conduit, a discharge conduit leading from the pumping mechanism, governing means for the pumping means, said governing means being under the joint control of a first controlling means and a second controlling means, said first means comprising a reciprocable element exposed to opposing pressures from a pair of sources, one of said pressures being derived from the suction draft on the approach side of the pumping mechanism, the other pressure being derived from a fluid, fluid pressure controlling means to control the opposing pressure exerted on the said element by said fluid, said controlling means comprising a movable element operable by a difference of pressures on its two sides, a first pressure on one side of the movable element being proportional to the pressure at a point in the said discharge conduit and a second pressure on the other side of the movable element being proportional to the pressure exerted by said fluid, and means responsive to a difference between the pressures on the two sides of the movable element to vary the pressure exerted by said fluid upon said reciprocable element.

4. The method of collecting liquid from an area of territory towards a pumping station, the level of which is at least as high as the level of portions of the territory, comprising the collecting of the liquid in wells throughout the territory and by drawing the liquid from the wells through a closed conduit extending from the pumping station by branches projected into each of the wells and having their open ends disposed near the bottoms of their respective wells and controlling the pumping effort so as to regulate, at all times, the degree of negative pressure set up in the conduit at the pumping station so as to maintain the levels of liquid contained in all of the wells above the open ends of the branches to keep the open ends of all the branches covered with liquid.

5. In a draining system adaptable for draining liquid from nearly level areas of territory, comprising a pumping station, a liquid pump thereat, a plurality of liquid collecting wells disposed at intervals throughout the territory to be served by the station, and a conduit extending from the central station pump to each of the wells, branches of said conduit disposed into each well, each branch having an open end adapted to be covered with liquid contained in the well, and means at the pumping station responsive to the amount of liquid contained in the wells, adapted to regulate the action of the pump to limit the pumping effort to that degree wherein sufficient liquid is left in all of the wells to keep the open ends of the said branches covered with liquid, said regulating means comprising a conduit adapted to conduct a separate flow of liquid to the pump on the approach side thereof under a constant head, said conduit being restricted at a plurality of points in its length, and a movable member responsive to the pressure of liquid intermediate said restrictions.

6. In a draining system adaptable for draining liquid from nearly level areas of territory, comprising a pumping station, a liquid pump thereat, a plurality of liquid collecting wells disposed at intervals throughout the territory to be served by the station, and a conduit extending from the central station pump to each of the wells, branches of said conduit disposed into each well, each branch having an open end adapted to be covered with liquid contained in the well, and regulating means at the pumping station, adapted to regulate the action of the pump to limit the pumping effort to that degree wherein levels of liquid will be maintained in the wells from the wells nearer the central station to the wells most remote therefrom, according to a gradient wherein the liquid contained in the nearest wells is sufficient to cover the open ends of the conduit branches projected therein, with a predetermined margin for safety, and wherein the level of liquid in the most remote wells is kept below the junction of their conduit branches with the main conduit, said regulating means comprising a governing element having an intermediate position and movable therefrom according to differences of pressure on its two sides, means operative to communicate a force to one side of said said element commensurable with the liquid pumping effort at any time exerted by the pump, means to communicate to the other side of the element a force commensurable to the "yield" of the system under the existing pumping effort, and means operative to vary the pumping effort according to variations in the forces exerted upon said governing element, moving it from its said intermediate balanced position.

7. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approach side of said pump.

8. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approaching side of said pump, and regulating means continuously effective to vary the pressure effort with which the standard pressure reacts against the said derived pressures, comprising means operative, differentially, according to variations from a predetermined relation of said standard pressure to the rate of yield, by the pipe of liquid under the influence of the pump.

9. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approach side of said pump, said pressure effort deriving means comprising a source of fluid supply of relatively known pressure and a conduit for introducing fluid therefrom into the pipe, said conduit comprising a fluid flow receiving chamber having a pair of spaced orifices in its walls, one of said orifices disposed to receive fluid from the said source, the other of said orifices disposed to discharge fluid from the chamber, to the pipe, and means for effecting communication of the pressure effort of fluid in the chamber, upon the controller.

10. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approach side of said pump, and regulating means continuously effective to vary the pressure effort with which the standard pressure reacts against the said derived pressure, comprising means operative differentially according to variations from a predetermined relation of said standard pressure to the rate of yield by the pipe of liquid under the influence of the pump, said pressure effort deriving means comprising a conduit disposed to effect communication of fluid between a point of relatively ascertainable fluid pressure and the pipe, said conduit comprising a fluid flow receiving chamber having a pair of spaced orifices in its walls, one of said orifices disposed to receive fluid, the other of said orifices disposed to discharge fluid from the chamber, and means for effecting communication of the pressure effort of fluid in the chamber, upon the controller.

11. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all side wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approach side of said pump, said governor being so related to the controller and the pump as to invariably respond to variations of control exercised over said governor by said controller to effect changes in the pumping effort as to tend to restore the predetermined relation existing between the opposing force of said standard pressure and the derived pressure exerted upon said controller.

12. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departures from a predeterminded relation existing between the opposing forces exerted by the derived pressure and said standard pressure, effective to continuously control the governor so as to vary the degree of sub-atmospheric pressure effective on the approach side of said pump, and regulating means continuously effective to vary the pressure effort with which the standard pressure reacts against the said derived pressure, comprising means operative differentially according to variations from a predetermined relation of said standard pressure to the rate of yield by the pipe of liquid under the influence of the pump, said governor being so related to the controller and the pump as to invariably respond to variations of control exercised over said governor by said controller to effect changes in the pumping effort as to tend to restore the predetermined relation existing between the opposing force of said standard pressure and the derived pressure exerted upon said controller.

13. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approach side of said pump, said pressure effort deriving means comprising a source of fluid supply of relatively known pressure and a conduit for introducing fluid therefrom into the pipe, said conduit comprising a fluid flow receiving chamber having a pair of spaced orifices in its walls, one of said orifices disposed to receive fluid from the said source, the other of said orifices disposed to discharge fluid from the chamber, to the pipe, and means for effecting communication of the pressure effort of fluid in the chamber, upon the controller, said governor being so related to the controller and the pump as to invariably respond to variations of control exercised over said governor by said controller to effect changes in the pumping effort as to tend to restore the predetermined relation exerted by the opposing force of said standard pressure and the derived pressure exerted upon said controller.

14. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, a governor common to all said wells for governing the pumping action, pressure means for deriving a force which is at all times commensurable with the intensity of pumping effort exerted by said pump on its approach side, means for exerting a force of standard pressure, a controller differentially responsive to departure from a predetermined relation existing between the opposing forces exerted by the derived pressure and said standard pressure, effective to continuously control the governor so as to vary the degree of sub-atmospheric pressure effective on the approach side of said pump, and regulating means continuously effective to vary the pressure effort, with which the standard pressure reacts against the said derived pressure, comprising means operative differentially according to variations from a predetermined relation of said standard pressure to the rate of yield by the pipe of liquid under the influence of the pump, said pressure effort deriving means comprising a conduit disposed to effect communication of fluid between a point of relatively ascertainable fluid pressure and the pipe, said conduit comprising a fluid flow receiving chamber having a pair of spaced orifices in its walls, one of said orifices disposed to receive fluid, the other of said orifices disposed to discharge fluid from the chamber, and means for effecting communication of the pressure effort of fluid in the chamber, upon the controller, said regulating means operative by successive regulating effects upon said governor and said pump to tend to restore the said predetermined relation of said standard pressure and the said rate of yield.

15. In a liquid collecting system, a suction pump, spaced outlying liquid collecting wells disposed at different distances from said pump, a single line of pipe adapted to communicate liquid drawn from all said wells to the pump, a duct having a lower open end, for each well comprising a depending branch of the pipe, said pump adapted to reduce the fluid pressure existing in the pipe on the approach side of the pump to sub-atmospheric pressure, governor common to all said wells for governing the pumping action, pressure means for deriving a force which is at all times commensurable with the intensity of pumping effort exerted by said pump on its approach side, means for exerting a force of standard pressure, a controller differentially responsive to departures from a predetermined relation existing between the opposing forces exerted by the derived pressure and said standard pressure, effective to continuously control the governor so as to vary the degree of sub-atmospheric pressure effective on the approach side of said pump, and regulating means continuously effective to vary the pressure effort with which the standard pressure reacts against the said derived pressure, comprising means operative differentially according to variations from a predetermined relation of said standard pressure to the rate of yield by the pipe of liquid under the influence of the pump, said governor being so related to the controller and the pump as to invariably respond to variations of control exercised over said governor by said controller to effect changes in the pumping effort as to tend to restore the predetermined relations exerted by the opposing force of said standard pressure and the derived pressure exerted upon said controller, said regulating means operative by successive regulating effects upon said governor and said pump to tend to restore the said predetermined relation of said standard pressure and the said rate of yield.

In testimony whereof I hereunto affix my signature this 19th day of April, 1927.

GEORGE GOODELL EARL.